June 7, 1949.                    H. C. SAGE                    2,472,762
                                 HARVESTER
Filed April 11, 1944                                         4 Sheets-Sheet 1

INVENTOR
H.C. Sage
BY
Webster & Webster
ATTYS

June 7, 1949.  H. C. SAGE  2,472,762
HARVESTER

Filed April 11, 1944  4 Sheets-Sheet 2

INVENTOR
H. C. Sage
BY
ATTYS

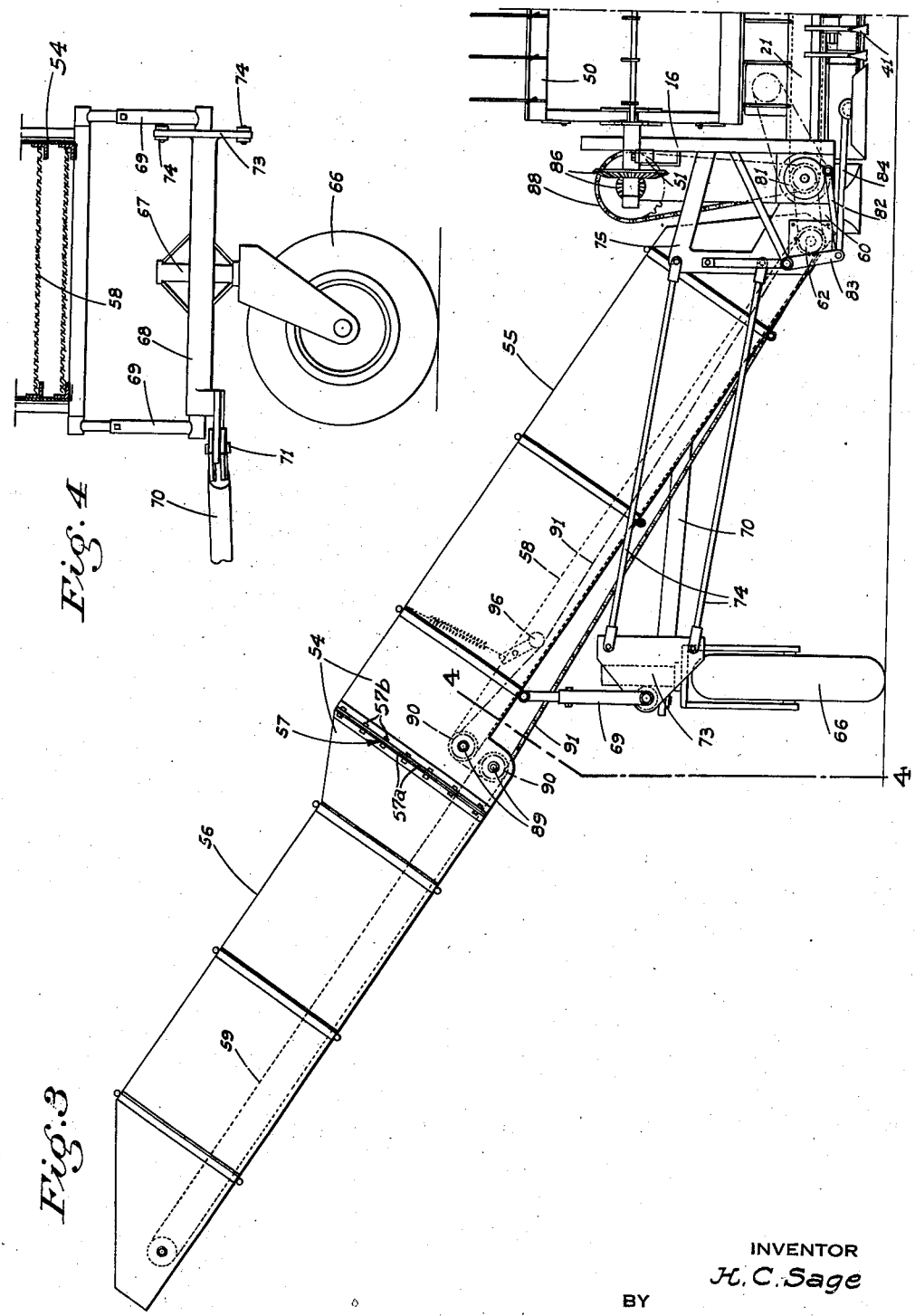

June 7, 1949.
H. C. SAGE
HARVESTER
2,472,762
Filed April 11, 1944
4 Sheets-Sheet 4
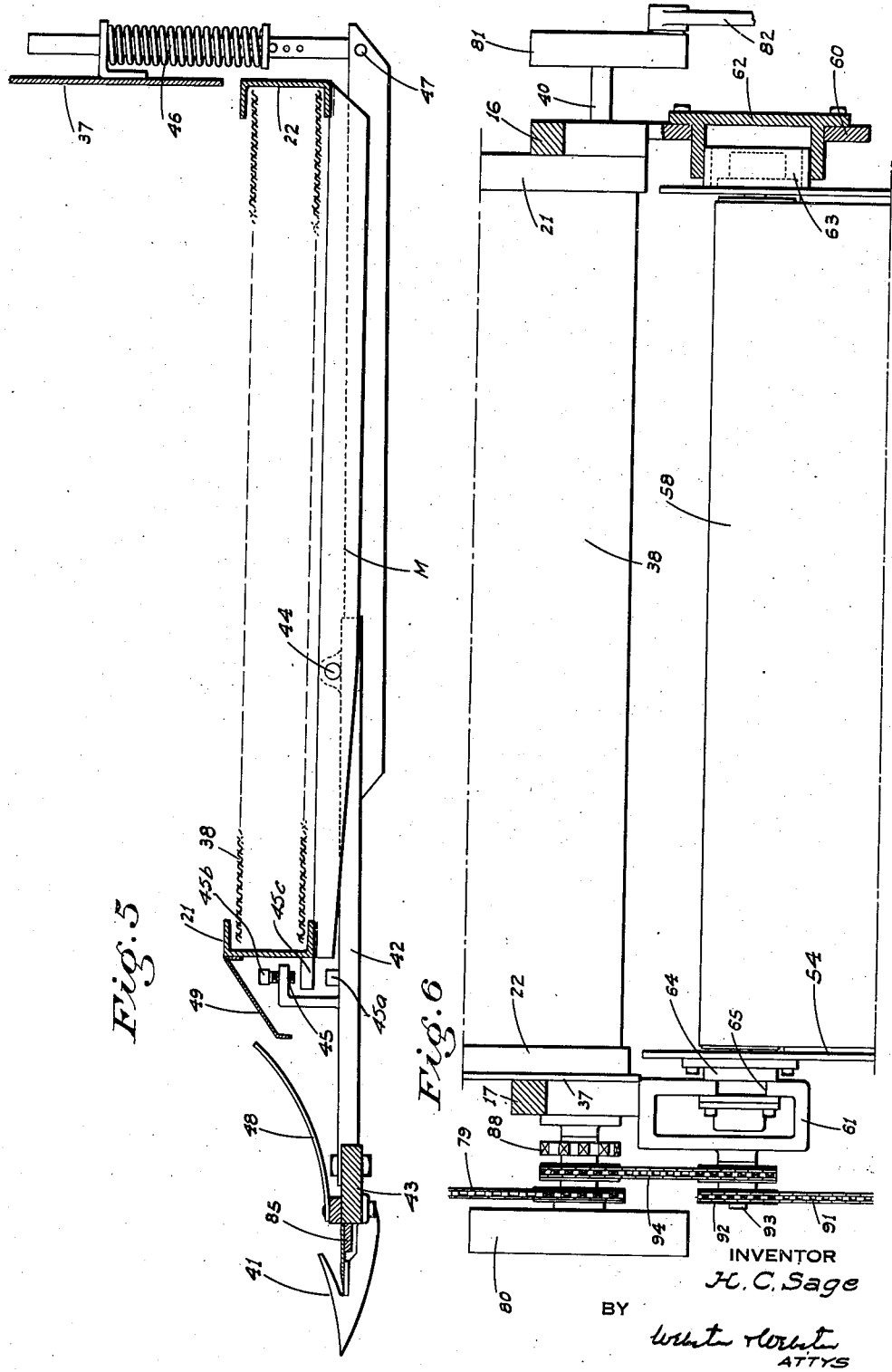
INVENTOR
H. C. Sage
BY
ATTYS Patented June 7, 1949

2,472,762

UNITED STATES PATENT OFFICE 2,472,762

HARVESTER

Harry C. Sage, Stockton, Calif., assignor to Thomson-Sage, Inc., Stockton, Calif., a corporation of California Application April 11, 1944, Serial No. 530,459

8 Claims. (Cl. 56—23)

1

This invention relates in general to an improved, self-propelled harvester, and in particular the invention is directed to, and it is an object to provide, a harvester of such type especially designed for use in harvesting green crops such as spinach, peas, lima beans, alfalfa, and the like.

A further object of this invention is to provide a harvester for crops as above, which is operative, upon advance of the implement, to mow and elevate the crop to a laterally disposed point of discharge some distance above the ground, whereby to load an open body truck which runs alongside the harvester.

An additional object of this invention is to provide a self-propelled harvester which comprises in unitary combination with a tractor, a header assembly, including a sickle bar unit and pick-up reel, disposed adjacent and directly ahead of the tractor, said header assembly being mounted in vertically adjustable connection with the tractor and arranged to be pushed thereby, and an endless elevator conveyor extending from the discharge end of the header assembly draper at an upward and laterally outward incline for discharge into the truck which moves forwardly with and alongside the implement.

A still further object of the invention is to employ unique mounting and adjusting means between the pusher tractor and the front-end header assembly; the adjusting means being operable by the driver of the tractor from his seat on the latter.

Other objects are to provide a novel drive assembly between a power take-off shaft at the forward end of the tractor, and the sickle bar unit, header draper, and elevator conveyor; to provide a floating mount for said sickle bar unit; and to connect the elevator conveyor with the header for ready removal preparatory to transport of the implement from place to place.

A further object of the invention is to provide a harvester which is exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

2

Figure 1:
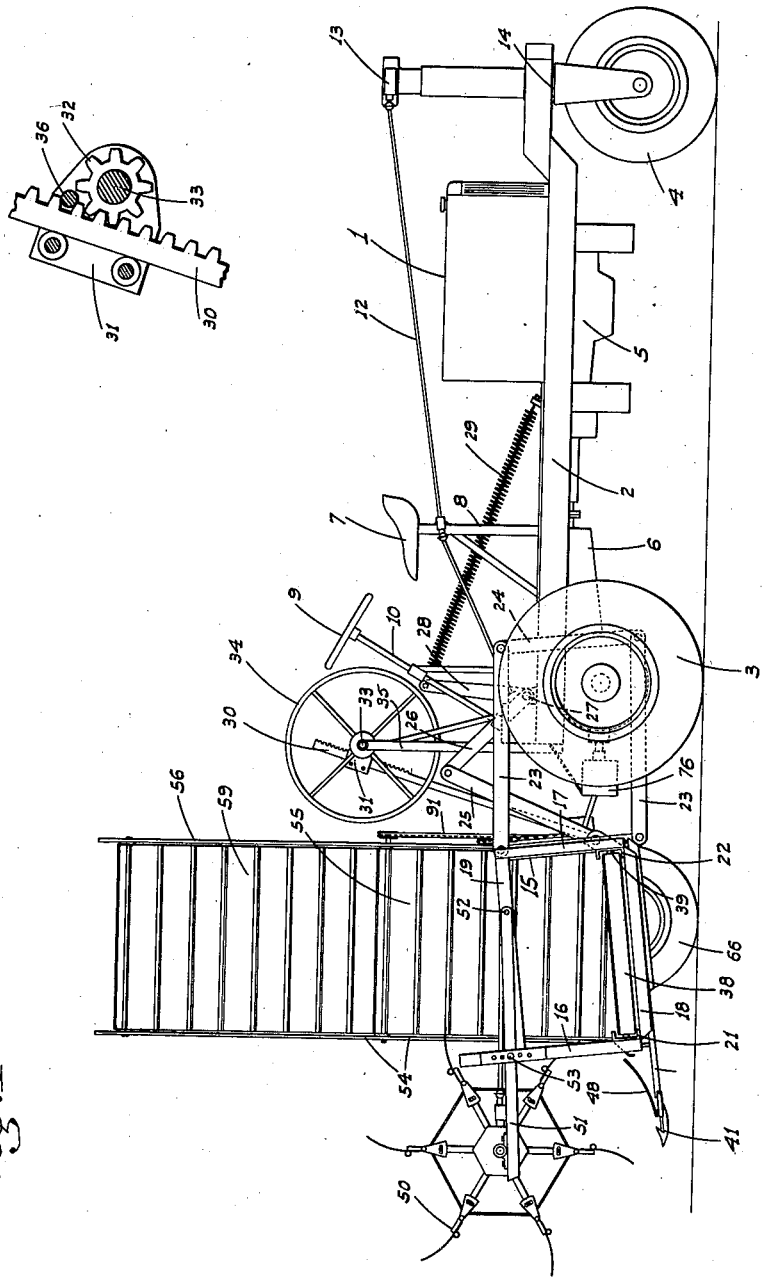
Figure 1 is a side elevation of the improved harvester.
Figure 2:
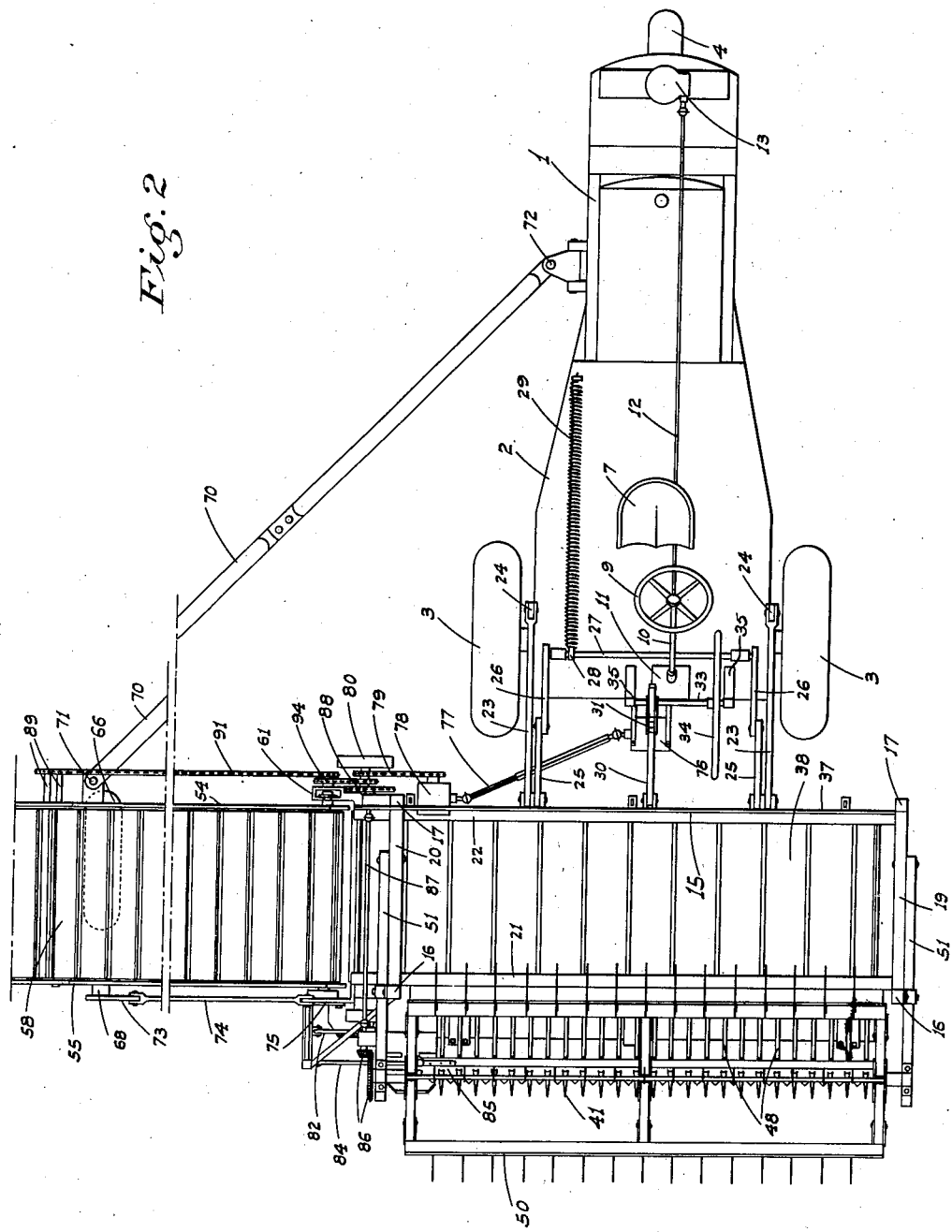
Figure 2 is a top plan view thereof; the elevator conveyor being foreshortened.

Figure 3 is an enlarged fragmentary front end view of the header assembly and elevator conveyor associated therewith.

Figure 4 is a cross section on line 4—4 of Fig. 3.

Figure 5 is an enlarged fragmentary section of the header illustrating the floating mount for the sickle bar unit.

Figure 6 is an enlarged fragmentary plan illustrating the means of detachably connecting the lower end of the elevator conveyor in connection with the adjacent end of the header frame.

Figure 7 is a fragmentary enlarged sectional elevation showing the locking means for the header assembly adjusting rack and pinion.

Referring now more particularly to the characters of reference on the drawings, the implement comprises a tractor indicated generally at 1, and which tractor comprises a main frame or chassis 2 supported at its front end by a pair of transversely spaced wheels 3 and at its rear end by a single centrally disposed tiller wheel 4. The wheels 3 are nonsteerably mounted and are driven from a chassis supported engine 5 by means of a power transmission mechanism indicated generally at 6.

An operator's seat 7 is mounted on a pedestal 8 upstanding from the chassis 2 adjacent its forward end. The tiller wheel 4 at the rear of the tractor is steered from a steering wheel 9 disposed ahead of the seat 7; there being motion transmitting connections between the steering wheel 9 and tiller wheel 4. Such motion transmitting connections include a steering post 10, connected in driving relation with conventional gearing (not shown) in gear box 11, and a shaft assembly 12 which includes suitable universal couplings therein, one end of the shaft assembly being connected in driving relation with the gearing in box 11 and the other end being connected in driving relation with conventional gearing (not shown) in another gear box 13 mounted on the upper end of the tiller wheel supporting spindle 14 at the rear of the tractor.

A header assembly, indicated generally at 15, is disposed ahead of the tractor in transverse relation thereto, and such header assembly is supported above ground from the tractor in the following manner:

The header assembly 15 includes a header frame made up of two pairs of spaced apart upstanding front and rear posts 16 and 17, corresponding front and rear posts being connected by a bottom cross beam 18, and top cross beams 19 and 20, respectively. Longitudinal bottom beams 21 and 22 connect between each pair of the vertical posts 16 and 17, respectively. Transversely spaced pairs of vertically spaced, parallel links 23 are pivotally connected at their rear ends to substantially vertical posts 24 fixed on the chassis 2 adjacent wheels 3; the links 23 projecting forwardly to pivotal connection with the back portion of the header frame.

A pair of rigid links 25 are pivoted at their lower ends to the header frame at the rear and adjacent its bottom, and the links 35 extend at an upward and rearward incline to pivotal connection at their upper ends with corresponding ends of radial arms 26 which are fixed on and project at a forward and upward incline from a cross shaft 27 turnably mounted on top of the chassis 2. The shaft 27 is also fitted with a fixed upstanding radial arm 28. A heavy duty tension spring 29 connects between the upper end of arm 28 and a rearwardly disposed point on the chassis 2; the spring 29 tending to lift links 25 and the header frame, and thus serving as a counter-balance for the header assembly adjusting means which comprises the following:

A rack bar 30 is pivoted at its lower end in connection with the header frame at a point substantially centrally between the parallel links 23 and thence extends at an upward and rearward incline through a box 31 which encloses a pinion 32. The pinion 32 is fixed on a stub shaft 33 which carries a relatively large diameter hand wheel 34; the rack and pinion assembly, together with the hand wheel, being supported by a frame 35.

It will be seen that upon rotation of the hand wheel in one direction or the other, the header assembly 15 will be raised or lowered, with the spring 29 serving to counter-balance such movement. When the header assembly is adjusted to a given position, a locking pin 36 is projected through housing 31 in engagement with the teeth or rack 30, preventing the latter from running down.

The header frame supports a solid back plate 37, and an endless horizontal draper 38 extends from end to end of the header assembly and is supported at its opposite ends by shafts 39 and 40.

A sickle bar unit, indicated generally at 41, is included in the header assembly and is disposed some distance ahead and slightly below the front bottom beam 21. Such sickle bar unit is mounted in connection with transversely spaced, longitudinally extending supporting arms 42 fixed at their forward ends to the cutter bar 43 of the unit 41; these arms terminating at their rear ends a short distance back of bottom beam 22 of the header frame. Intermediate their ends the supporting arms 42 are pivoted, as at 44, to cross members M of the header frame for limited vertical swinging movement; such movement being limited both in an upward and downward direction by a stop unit 45 comprising two spaced stops 45a and 45b, the latter being an adjustable screw, movable on opposite sides of a stop element 45c fixed to the beam 21. Adjustable counterbalance spring units 46 are mounted on the header at the back thereof and such counterbalance spring units are pivotally connected at their lower ends, as at 47, to the adjacent rear ends of the supporting arms 42. By reason of the above described arrangement, the sickle bar unit 41 is supported in vertically floatable and counterbalanced relation.

In order to assure delivery from the sickle bar unit to the draper 38 of the crop as cut, a plurality of arcuate spring fingers 48 are secured to the sickle unit in relatively close but spaced relation, and extend at an upward and rearward incline; such fingers, at their upper ends, overhanging a forwardly and downwardly inclined skirt 49 fixed on bottom beam 21 of the header frame.

A pick-up reel, indicated generally at 50, is disposed above the sickle bar unit 41 in cooperating relation, said pick-up reel being of substantially conventional construction and being mounted at its ends on and supported by rigid arms 51 pivoted at their rear ends to the header frame beams 19 and 20, as at 52, and being vertically adjustably connected with adjacent and corresponding front posts 16, as at 53. By reason of the vertical adjustability of arms 51 the pick-up reel 50 can be disposed at the desired working distance from the sickle bar unit 41.

The draper 38, sickle bar unit 41, and pick-up reel 50 are power driven from the tractor by a drive mechanism which will hereinafter be described.

The draper 38 delivers at one end onto a laterally extending, upwardly inclined elevator conveyor, indicated at 54, and which conveyor includes a lower section 55 and an upper section 56; such sections being detachably connected at 57 by means of registering flanges 57a secured in face to face relationship by bolts 57b. The elevator conveyor sections 55 and 56 include separate endless drapers or conveyors, indicated at 58 and 59, respectively. The purpose of such separate conveyors is to permit of disconnection of sections 55 and 56 for transport. Further, the elevator conveyor section 55 is detachably connected with the header frame as follows:

The header frame includes, at its adjacent end and at the bottom, laterally projecting brackets 60 and 61, the bracket 60 including a removable cup 62 which normally engages with the adjacent bearing housing 63 at the lower end of conveyor section 55, while the corresponding bearing housing 64 on the opposite side of conveyor section 55 is annularly grooved and removably seated in a notch 65 in bracket 61. By removing the cup 62, the conveyor section 55 may be readily detached from the draper assembly. The drive for endless conveyors 58 and 59, as hereinafter described, is also readily detachable from the remainder of the apparatus, as will appear.

When the implement is in use the elevator conveyor 54 is supported, intermediate its ends, by a ground engaging caster wheel 66 whose spindle housing 67 is mounted in connection with a rigid frame including a longitudinally extending horizontal bar 68 having adjustable legs 69 upstanding from the ends thereof and pivotally connected at their upper ends with the conveyor section 55. A diagonally disposed rod 70 is pivotally connected at its forward end, as at 71, to the rear end of bar 68, and is universally connected at its rear end, as at 72, to the chassis. Adjacent its forward end the bar 68 is provided with a fixed, upstanding end plate 73, and a pair of vertically spaced parallel links 74 connect between said plate and a substantially rectangular frame member 75 projecting edgewise laterally from the header frame slightly ahead of the elevator conveyor 54. With the above described caster wheel and mount assembly, the elevator conveyor 54 is effectively supported intermediate its ends, and yet the lower end of said conveyor may be adjusted vertically with the draper assembly.

The drive mechanism for the draper 38, sickle bar unit 41, pick-up reel 50, and elevator conveyor 54 comprises the following:

A gear box 76 containing conventional power take off gears (not shown) is mounted on and projects from the front of the tractor centrally between the wheels 3. Another gear box 78 is mounted on the back of the header assembly adjacent the bottom thereof and such box 78 also contains conventional gearing (not shown). A universal drive shaft 77 is connected in driving relation with the gearing in both boxes. The gearing in the box 78 is also connected in driving relation with an endless chain 79. This endless chain 79 derives draper shaft 40, from gear box 78, through a slip clutch 80 of conventional design. At the opposite end the shaft 40 is fitted with a crank wheel 81 which reciprocates a link 82, which in turn is pivotally connected with the lower end of a depending swing lever 83. A pitman rod 84 connects between the lower end of swing lever 83 and the adjacent end of the knife bar 85 of the sickle bar unit. Thus, upon rotation of shaft 40, the lever 83 is swung back and forth, reciprocating said knife bar 85.

The reel 50 is driven at one end by a bevel gear and pinion unit 86 actuated by a universal-jointed and extensible cross shaft 87 on the header frame adjacent the top of the latter; said cross shaft being driven at the end opposite the bevel gear and pinion unit 86, and from the shaft 40, by a sprocket and chain assembly 88.

The endless conveyors 58 and 59 are provided at adjacent ends with laterally projecting shafts 89 which carry sprockets 90, both of which are driven by a single endless chain 91 which leads downwardly therefrom along one side of the elevator conveyor 54 about another sprocket 92 on a stub shaft 93 projecting outwardly from bracket 61. The sprocket 92 is driven from shaft 40 by an endless chain and sprocket assembly 94. With this drive arrangement for the elevator conveyor 54, it is only necessary to disconnect the chain and sprocket assembly 91—94 in order to permit of removal of conveyor 54 from the remainder of the implement. Also, it is only necessary to disconnect said endless chain 91 from sprocket 90 of draper 59 when it is desired to separate the sections 55 and 56 of elevator conveyor 54 for transport. The endless chain 91 is normally held taut by a spring actuated chain tightener 96.

When the above described harvester is in operation the operator, from the seat 7, cannot only steer the implement but may adjust the header frame assembly as necessary by use of the hand wheel 34. Suitable engine controls (not shown) for the engine 5 are of course provided on the tractor for the operator.

With advance of the implement, the sickle bar unit 41 may float as ground conditions require, and the crops as cut are swept from the sickle bar unit onto the draper 38 by means of the pick-up reel 50. From the draper 38 the cut crops deliver onto the elevator conveyor 54, from which they discharge at the upper end of such conveyor into a truck which follows alongside the implement with the truck body in receiving position below the upper end of said elevator conveyor.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A means for adjustably mounting an implement relative to a tractor including a substantially rectangular upstanding frame at the back of the implement, a pair of transversely spaced upstanding posts on the tractor frame, transversely spaced pairs of links, the links of each pair at their rear ends being pivotally secured to the top and bottom, respectively, of one of said posts, and at their front ends being pivotally secured to the rectangular frame of said implement, a separate lift control means interposed between the tractor and the implement, and a separate means counterbalancing the implement.

2. A harvester comprising in combination, a tractor, a header assembly disposed transversely in front of the tractor, such header assembly including a sickle bar and a side delivery draper, means connecting the draper supporting frame with the tractor frame for vertical adjustment relative to the tractor, a frame supporting the draper, brackets projecting from one end of the draper frame, an upwardly inclined elevator conveyor journaled in said brackets, a ground engaging caster wheel disposed beneath the conveyor intermediate its ends, a spindle housing in which the caster wheel pin is journaled, a rigid frame supporting the housing, upstanding legs on the frame supporting the conveyor, an upstanding plate on the rigid frame, an upstanding frame on the end of the draper supporting frame adjacent the conveyor, and a pair of vertically spaced parallel links pivotally connected between said plate and the last named upstanding frame.

3. A combination as in claim 2 and including therewith a rod connected with said rigid frame and extending to a point of pivotal connection with the tractor frame.

4. In combination, a tractor, a header including a sickle bar and a side delivery draper, means mounting the header on the tractor for vertical adjustment relative to the tractor, a laterally extending upwardly inclined elevator conveyor pivotally connected to the header at a point adjacent the side delivery draper and arranged to receive material from the draper, a ground engaging wheel disposed laterally of the tractor, and means supporting the conveyor on the wheel at a point intermediate the ends of such conveyor, and means hingedly connecting said supporting means with the tractor frame and header, respectively.

5. A combination as in claim 4 in which said last named means includes a diagonal brace connecting from a point intermediate the ends of the conveyor to a point on the tractor frame, the latter connection including a universal point.

6. A combination as in claim 4, in which said last named means includes a pair of vertically spaced parallel links pivotally connected at one end in connection with the supporting means between the wheel and conveyor and the other ends of said links being pivotally connected with the header.

7. A means for adjustably mounting an implement relative to a tractor including a substantially rectangular back frame on the implement, transversely spaced pairs of vertically spaced links, the inner ends of said links being connected in pivotal relation to the tractor frame, the other ends of said links being respectively pivotally connected adjacent the top and bottom edges of the rectangular frame of the implement, a tension element, one end of such tension element being pivotally connected with the rectangular frame adjacent the bottom edge thereof, the other end of said tension element being mounted on the tractor frame for longitudinal adjustment with respect thereto, and means for adjusting the element.

8. A structure as in claim 7 and including a counter-balance means for the implement relative to the tractor, such counter-balance means including a turnable shaft mounted transversely on the tractor frame, an upwardly projecting arm rigid with the shaft, a tension spring connected between the upper end of said arm and a point on the tractor frame, another arm rigid with the shaft and projecting upwardly and outwardly therefrom in diverging relation with respect to the first arm, and a link pivotally connected at one end to the outer end of said second named arm and at its other end to the rectangular frame adjacent the bottom edge thereof.

HARRY C. SAGE.

REFERENCES CITED

The following references are of record in the file of this patent:

UNITED STATES PATENTS

| Number | Name | Date |
|---|---|---|
| 762,585 | Holley | June 14, 1904 |
| 1,102,846 | Young | July 7, 1914 |
| 1,183,092 | McGill | May 16, 1916 |
| 1,469,157 | Kast | Sept. 25, 1923 |
| 1,539,011 | Harris | May 26, 1925 |
| 1,542,126 | Harris | June 16, 1925 |
| 1,996,294 | Hume et al. | Apr. 2, 1935 |
| 2,099,471 | Edgington | Nov. 16, 1937 |
| 2,215,178 | Hume et al. | Sept. 17, 1940 |
| 2,298,121 | Grimes | Oct. 6, 1942 |